United States Patent
Mueller et al.

[11] Patent Number: 5,873,430
[45] Date of Patent: Feb. 23, 1999

[54] CONTROL ELEMENT ARRANGEMENT FOR CONTROLLING THE STEERING ANGLE OF A MOTOR VEHICLE

[75] Inventors: Manfred Mueller, Nuremberg; Werner Reichelt, Esslingen; Peter Frank, Stuttgart, all of Germany

[73] Assignee: Daimler-Benz AG, Stuttgart, Germany

[21] Appl. No.: 781,987

[22] Filed: Jan. 6, 1997

[30] Foreign Application Priority Data

Jan. 4, 1996 [DE] Germany .................. 196 00 139.0

[51] Int. Cl.⁶ .................................................. B62D 5/00
[52] U.S. Cl. .......................... 180/402; 180/446; 701/42
[58] Field of Search .................................... 180/402, 421, 180/422, 446, 443; 701/41, 42

[56] References Cited

U.S. PATENT DOCUMENTS

| | | |
|---|---|---|
| 3,022,850 | 2/1962 | Bidwell et al. . |
| 4,984,646 | 1/1991 | Sano et al. .............................. 180/402 |
| 5,097,917 | 3/1992 | Serizawa et al. ....................... 180/402 |
| 5,125,602 | 6/1992 | Vauvelle ................................. 244/223 |
| 5,236,335 | 8/1993 | Takeuchi et al. . |
| 5,271,475 | 12/1993 | Takeshita . |
| 5,347,458 | 9/1994 | Serizawa et al. . |

FOREIGN PATENT DOCUMENTS

| | | |
|---|---|---|
| 42 07 719 | 9/1993 | Germany . |
| 4-38270 | 2/1992 | Japan . |
| 5-238406 | 9/1993 | Japan . |
| 6-206558 | 7/1994 | Japan . |
| 2 217 274 | 10/1989 | United Kingdom . |

Primary Examiner—Brian L. Johnson
Assistant Examiner—Avraham H. Lerner
Attorney, Agent, or Firm—Evenson, McKeown, Edwards & Lenahan, P.L.L.C.

[57] ABSTRACT

Control element arrangement for controlling the steering angle of a motor vehicle is provided. The arrangement has a user-operable control element by whose operation a steering angle adjusting unit can be controlled for the steering angle adjustment of the vehicle wheels which is mechanically uncoupled from the control element. A reaction force mechanism is provided for such an arrangement which exercises a reaction force onto the control element which counteracts the control element operating force and which rises when the steering angle size increases as well as when the longitudinal and/or lateral movement of the vehicle increases.

8 Claims, 2 Drawing Sheets

CONTROL ELEMENT ARRANGEMENT FOR CONTROLLING THE STEERING ANGLE OF A MOTOR VEHICLE

BACKGROUND AND SUMMARY OF THE INVENTION

This invention relates to a control element arrangement for controlling the steering angle of a motor vehicle and, more particularly, to a control element arrangement for controlling the steering angle of a motor vehicle having a user-operable control element by whose operation a steering angle adjusting unit which is mechanically uncoupled from the control element can be controlled for the steering angle adjustment of vehicle wheels.

In the case of a conventional steering wheel arrangement for the steering angle control, the steering angle adjustment takes place by the direct mechanical transmission of the rotating movement of the steering wheel to the respective vehicle wheels. It is known to provide, instead of a steering wheel, a user-operable control element which is mechanically uncoupled from the steering movement of the wheels. By means of the operation of the control element, a steering angle adjusting unit can be controlled instead which, in turn, carries out the corresponding steering angle adjustment of the wheels. Such an arrangement with a manually operable control element is described in the article by H. Bubb, "Work Site— Driver, An Ergonomic Study", *Automobil-Industrie* 3/85, Page 265. Other similar arrangements are described in U.S. Pat. No. 3,022,850 and in the *Convention Volume Publication* by Brănneby, et al., "Improved Active and Passive Safety by Using Active Lateral Dynamic Control and an Unconventional Steering Unit, 13th International Technical Conference on Experimental Safety Vehicles, *Proceedings* Vol. 1 , Nov. 4 to 7, 1991, the disclosures of which are incorporated by reference herein as non-essential material.

Because of the mechanical uncoupling of the control element from the pertaining steering movement of the wheels, in the case of such arrangements, the reaction force effect of the steering rotating movement of the wheels on the control elements which is customary in conventional steering wheel arrangements is naturally absent. As a replacement, it is suggested in the above-mentioned U.S. Pat. No. 3,022,850 to design the control element in the form of a control stick with a comparatively heavy upper end head whose inertial force is opposed to the operating force exercised on the control stick by the user and, as a result, counteracts increasing steering angles. As a result, the operator is to receive a certain reaction force acknowledgment concerning the intensity of the respective demanded steering angle, and by means of this measure, the steering is to be slightly stabilized when there is a danger of swerving.

In the above-mentioned *Convention Volume Publication,* P. Brănneby, et al. suggest that the control element arrangement be designed such that a reaction force is exercised on the control element which is to be overcome for operating the control element. As the size of the steering angle increases, the reaction force rises preferably non-linearly, for example, in sections linearly with a hysteresis, in which case the sensitivity of the steering angle adjustment is simultaneously increasingly selected as a function of the vehicle speed with a higher longitudinal vehicle speed.

The present invention is based on the technical problem of providing a control element arrangement of the above-mentioned type in which case the user receives a reaction force acknowledgment, which is as informative as possible, on the control element for the intuitive detection of the steering-angle-related driving situation.

This problem is solved by a control element arrangement according to the present invention having a user-operable control element by whose operation a steering angle adjusting unit which is mechanically uncoupled from the control element can be controlled for the steering angle adjustment of vehicle wheels. A reaction force mechanism is provided which exercises a reaction force on the control element which counteracts the control element operating force and which rises with an increasing steering angle size ($\alpha$) as well as with an increasing longitudinal and/or lateral movement of the vehicle.

This arrangement according to the invention contains a reaction force mechanism whose construction can be of a conventional type for exercising an active reaction force on the control element, in which case it is now designed such that the reaction force which is exercised on the control element and counteracts the operating force of the control element rises not only as the size of the steering angle increases but also with an increasing longitudinal and/or lateral movement of the vehicle. In this case, the reaction force may be limited in the upward direction by a maximum force. Analogously, as required, the control element deflection may be limited by an appropriately high reaction force. The linking of the reaction force component which depends on the size of the steering angle with the reaction force component which depends on the longitudinal and/or lateral movement of the vehicle can take place in different fashions, for example, by adding or multiplying. The reaction force, which is actively exercised on the control element mechanically uncoupled from the steering movement of the wheels simulates in a fashion which is close to reality the steering stiffness customary in conventional steering wheel arrangements.

In a further advantageous development of the invention, the reaction force component which is dependent on the longitudinal speed of the vehicle will linearly increase with a rising speed only when a certain minimum speed is exceeded.

In a yet further advantageous development of the invention, the reaction force component which is a function of the size of the steering angle is varied as a function of the vehicle speed by the fact that the value of this reaction force component at the break, which connects two linear sections of the characteristic curve of a different slope with one another, is selected to fall with an increasing longitudinal speed, whereby the rate of change of this reaction force component becomes smaller with a rising longitudinal speed of the vehicle in the range of small steering angle sizes and increases in the range of large steering angle sizes. As required, the characteristic curve of the reaction force component may contain several such breaks and thus may be composed of more than two linear sections having different slopes.

A further advantageous development of the invention provides the user with an intuitive acknowledgment which can be detected by way of the control element and which indicates that the vehicle has reached a driving-dynamic limit situation. In this case, the reaction force applied to the control element contains a vibration force component, in which case for a further intuitive information concerning vehicle dynamics with a driving situation which becomes more critical, its vibration frequency will fall and/or its vibration amplitude will rise.

When the control element is arranged laterally next to a vehicle operating site, and when it can be manually operated in the transverse direction, it is advantageous in a further development of the invention to design the reaction force applied to the control element asymmetrically. Specifically, at the same longitudinal speed of the vehicle and the same steering angle size, the reaction force is designed to be higher in the direction of the vehicle operating site than in the opposite direction (away from the operator). This corresponds to the fact that the user situated at the vehicle operating site carries out an operation of the control element in the direction away from the vehicle operating site essentially only by the pressing of the thumb, whereas, for operating the control element toward the vehicle operating site, he can use all four other fingers of the hand reaching around the control element.

Other objects, advantages and novel features of the present invention will become apparent from the following detailed description of the invention when considered in conjunction with the accompanying drawings.

DETAILED DESCRIPTION OF THE DRAWINGS

Figure 4:
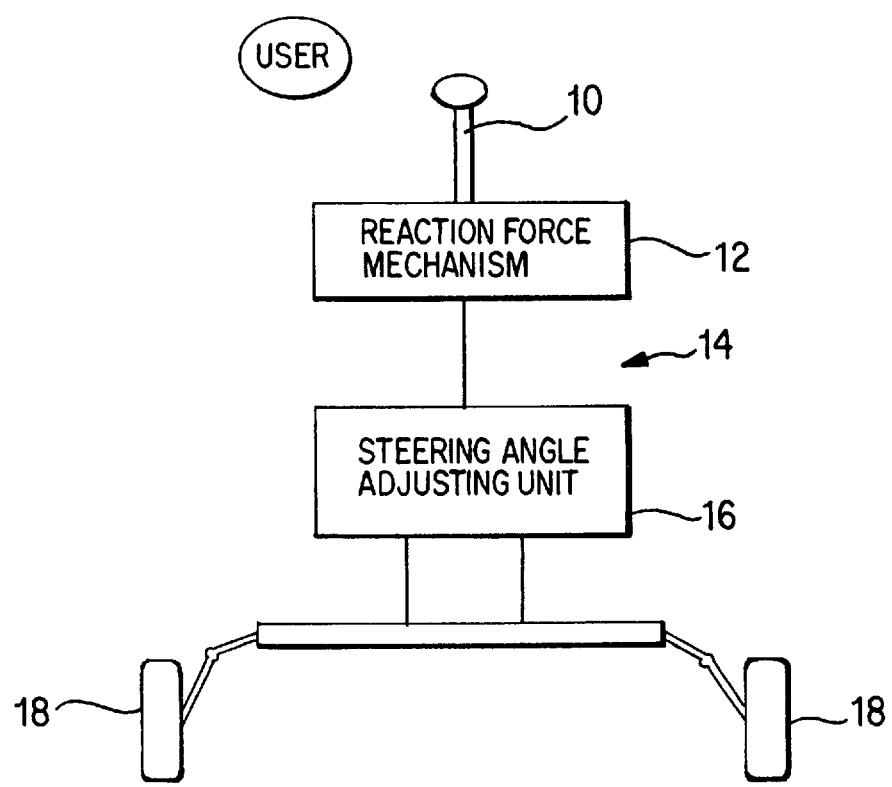
FIG. 4 is a block diagram representing a control element arrangement according to the present invention.

Referring to FIG. 4, by means of a reaction force mechanism 12, the illustrated characteristic reaction force lines are exercised on a user-operable control element which may be designed, for example, as a manually operable control stick 10, of a control element arrangement 14 for controlling the steering angle of a motor vehicle by whose operation a steering angle adjusting unit 16 can be controlled for the steering angle adjustment of the vehicle wheels 18 which is mechanically uncoupled from the control element. The construction of this type of control element arrangement for controlling the steering angle while mechanically uncoupling the control element from the steering angle adjusting unit causing the steering movement of the wheels and having a reaction force mechanism which generates an acknowledgment in the form of a corresponding reaction force onto the control element and is typical of the respective driving situation and can be intuitively felt by the user during the operation of the control element, is state of the art. This type of a construction therefore does not have to be discussed here in any detail. Reference can be made in this respect, for example, to the known control element arrangements of this type, such as U.S. Pat. No. 3,022,850 the specification of which is expressly incorporated by reference herein. The significant novelty of the control element arrangement according to the invention is in its design with respect to the intensity of the reaction force in each case exercised on the control element as a function of the steering angle size as well as of the longitudinal speed of the vehicle which will be discussed in detail in the following.

Figure 1:
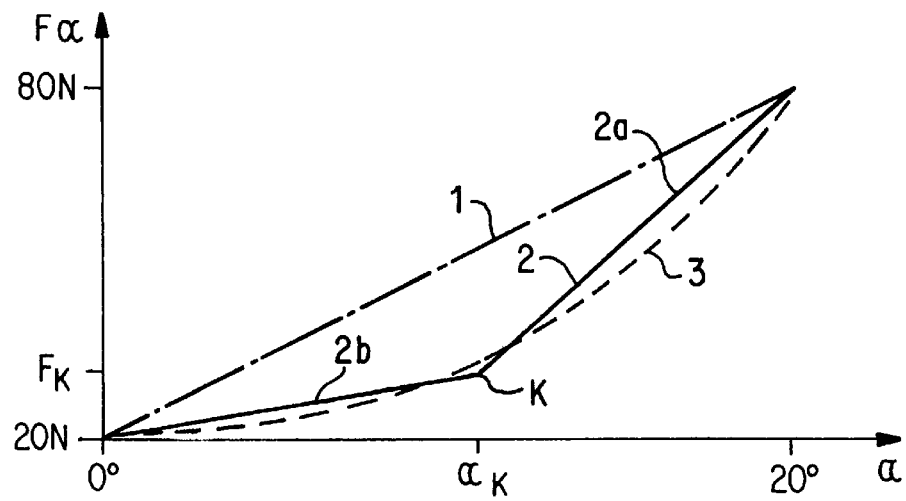
FIG. 1 is a diagram for illustrating characteristic curves of the reaction force component which is a function of the steering angle size and which is exercised on a user-operable control element of a steering angle control arrangement.
Figure 3:
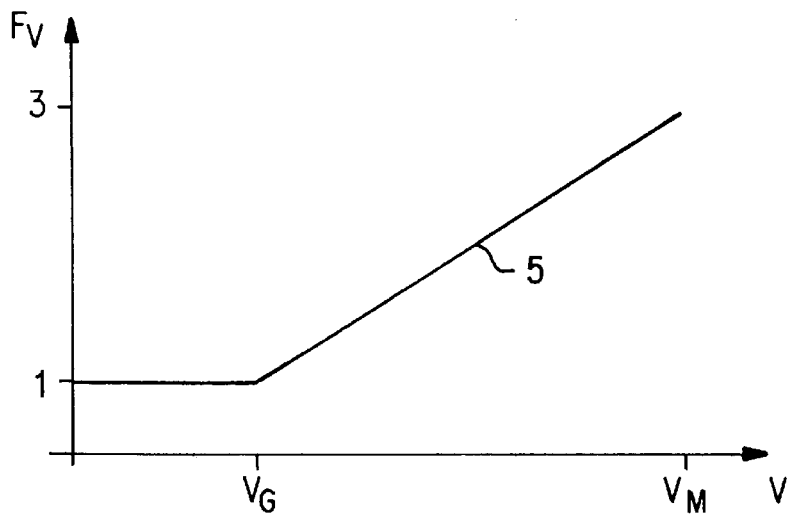
FIG. 3 is a characteristic curve diagram concerning the course of a reaction force component which is multiplicatively added to the reaction force component illustrated in FIG. 1 which is a function of the steering angle size.

In the described embodiment, the reaction force exercised by the system onto the control element is multiplicatively composed of a force component ($F_\alpha$), which is illustrated in FIG. 1 and is a function of the steering angle size ($\alpha$), and of a force multiplication factor ($F_v$), which is illustrated in FIG. 3 and is a function of the longitudinal speed (v) of the vehicle. For the course of the reaction force component ($F_\alpha$) which is a function of the steering angle size, various alternatives are considered. On the one hand, a linear rise is possible from a minimal reaction force, for example, of the amount 20N, at a 0° steering angle, to a maximal force value, for example, 80N, at the maximal steering angle size, for example, 20°, as illustrated by the characteristic dash-dotted line 1. However, a non-linear, specifically a convex course reaching a maximum, as represented by the broken characteristic line 3, comes closer to the reaction force behavior customary in the case of the conventional steering wheel. The solid characteristic line 2 represents a fairly good approximation to this convex course of the characteristic line, in which case this characteristic line 2 consists of two linear sections 2a, 2b which abut in a break (K). This characteristic curve 2, which is linear in sections, can be parameterized in a comparatively simple manner and can therefore be processed with relatively low computing expenditures. It therefore represents a currently preferred course of the reaction force component ($F_\alpha$) which is a function of the size of the steering angle. In the linear section 2b for smaller steering angle sizes between 0° and the break steering angle size ($\alpha_k$), the course of the characteristic line is flatter than in the linear section 2a for higher steering angle sizes between the break steering angle size ($\alpha_k$) and the maximal steering angle size.

Figure 2:
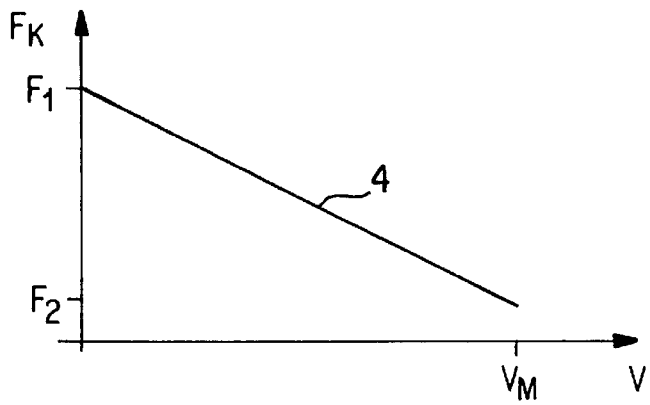
FIG. 2 is a characteristic curve diagram concerning the vehicle-speed-dependent course of the break function value of one of the characteristic curves illustrated in FIG. 1.

Preferably, in addition, the slope of the two linear characteristic line sections 2a, 2b as a function of the vehicle speed is influenced by the fact that the intensity ($F_k$) of the steering-angle-size-dependent reaction force component ($F_\alpha$) at the break (K) is selected to be variable as a function of the longitudinal vehicle speed (v) according to a characteristic line 4, as illustrated in FIG. 2. At a longitudinal vehicle speed (v) which rises from zero to the maximal speed ($v_M$), this characteristic curve 4 extends in a linearly falling manner from a maximal force value ($F_1$) to a minimal force value ($F_2$). This has the result that the break (K) of the steering-angle-size-dependent characteristic reaction force line 2 moves with a rising longitudinal vehicle speed (v) toward the abscissa, whereby the characteristic line section 2b of smaller steering angle sizes becomes flatter and that 2a of larger steering angle sizes becomes steeper. As the longitudinal vehicle speed (v) increases, the degree of the non-linearity of the steering-angle-size-dependent reaction force component ($F_\alpha$) therefore increases; that is, it rises with an increasing steering angle size first only very slow and comparatively rapidly only when the range of larger steering angle sizes is reached.

For obtaining the whole reaction force exercised on the control element, the above-explained steering-angle-size-dependent reaction force component ($F_\alpha$) is multiplied with a vehicle-speed-dependent force multiplication factor ($F_v$) which extends, for example, according to the characteristic line 5 illustrated in FIG. 3 as a function of the longitudinal speed (v) of the vehicle. As illustrated in FIG. 3, this force multiplication factor ($F_v$), which represents the vehicle-speed-dependent reaction force component, at speeds below a given threshold value ($v_G$) of, for example, 50 km/h, remains constant at the value one. It will then rise linearly at an increasing longitudinal vehicle speed (v) until, at the maximal vehicle speed ($v_M$), it reaches its maximum value, for example, the value three. In the case of the given steering angle, the reaction force onto the control element will therefore increase as the vehicle speed (v) rises.

On the whole, the system therefore exercises a reaction force onto the control element which is given by the multiplicative linking of the steering-angle-size-dependent force component ($F_\alpha$) with the vehicle-speed-dependent force multiplication factor ($F_v$). As a result of the reaction force, the user, when operating the control element, will feel an operating resistance on the control element which rises with an increasing steering angle size ($\alpha$) as well as with an increasing longitudinal vehicle speed (v), whereby excessive steering movements are prevented which, in the respective driving situation, may result in an instable vehicle handling. This increases the simulated steering stiffness for the control element mechanically uncoupled from the steering movement of the wheels with an increasing steering angle size ($\alpha$) and with an increasing longitudinal vehicle speed (v). For example, by way of his hand operating the control element, the vehicle operator therefore receives a very informative, intuitive reaction force acknowledgment concerning the respective driving-dynamic situation, particularly the driving situation concerning the steering angle.

It is understood that, in addition to the described multiplicative linking, other ways of linking the steering-angle-size-dependent force component and the vehicle-speed-dependent force component to form the overall reaction force component can be provided, particularly an additive linking. If the control element is manually operable and is arranged laterally of the vehicle operating site, for example, in an automobile on the right-side next to the driver's seat in the center console area, it is also advantageous to design the reaction force, for example, by means of an additional multiplicative, operating-direction-dependent force multiplication component asymmetrically in such a manner that the reaction force, in the case of the operation of the control element away from the vehicle operating site and thus from the body of the operator, is selected to be lower, for example, by the factor of two to three, than when the control element is operated in the opposite direction. This corresponds to the fact that the required operating force is more difficult to apply by the operator away from the body by means of the thumb alone than toward the body, for the purpose of which he can use the other four fingers of the hand which reach around the control element to pull it.

As required, by means of additional reaction force components, the reaction force behavior of a conventional steering wheel arrangement can be simulated to be even closer to reality. In particular, as additional reaction force components for this purpose, a friction force component can be simulated corresponding to an operating-condition-dependent swerving force at each point of approximately 2N to 5N; an inertial force component can be simulated corresponding to a fictitious control element mass of typically up to 2 kg; and/or a damping force component of approximately 2N to 5N can be simulated which counteracts the restoring force and is a function of the rate of change of the steering angle.

Another advantage is the addition of a vibration force component which will be exercised on the control element by the system when a driving dynamics control unit provided in the vehicle recognizes the reaching of a driving-dynamic limit situation. By means of the vibration movement of the control element caused as a result, the vehicle operator will then receive a haptic acknowledgement concerning the existence of such a limit situation. Preferably, the vibration frequency and the maximal control element deflection resulting from the vibration force component are coordinated with one another such that, as the driving situation becomes more critical, the vibration frequency decreases, for example, from 80 Hz to 20 Hz, and/or the vibration amplitude of the control element increases, for example, in the case of a swivellable control stick, from a swivel angle of 0.1° to a swivel angle of 1°.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A control element arrangement for controlling a steering angle of a motor vehicle, comprising:

a user-operable control element operable to control a steering angle adjusting unit for performing a steering angle adjustment of vehicle wheels, said steering angle adjusting unit being mechanically uncoupled from said control element;

a reaction force mechanism which exercises a reaction force on said control element to counteract a control element operating force, wherein said reaction force mechanism produces a rising reaction force with an increasing steering angle size ($\alpha$) as well as with at least one of an increasing longitudinal and lateral movement of the motor vehicle;

wherein a steering-angle-size-dependent reaction force component ($F_\alpha$) extends linearly below a break steering angle size ($\alpha_k$) with a first slope and, above the break steering angle size, extends linearly with a second slope which is larger than the first slope, an intensity ($F_k$) of said reaction force component at the break (K) being selected to be falling with an increasing longitudinal vehicle speed (v).

2. The control element arrangement according to claim 1, wherein the reaction force contains a vibration force component which occurs when a driving dynamic limit situation is reached which is recognized by a driving dynamics control device, and wherein as said limit situation becomes more critical, a vibration frequency of said vibration force component becomes smaller and/or its vibration amplitude becomes larger.

3. The control element arrangement claim 2, wherein the reaction force is designed asymmetrically when the control element is operated in a first direction towards a user so as to be higher than in a case of an opposite operation in a second direction away from the user.

4. The control element arrangement according to claim 1, wherein the reaction force is designed asymmetrically when the control element is operated in a direction toward a vehicle operating site so as to be higher than in a case of an opposite operation in a direction away from the vehicle operating site.

5. A control element arrangement for controlling a steering angle of a motor vehicle, comprising:

a user-operable control element operable to control a steering angle adjusting unit for performing a steering angle adjustment of vehicle wheels, said steering angle adjusting unit being mechanically uncoupled from said control element;

a reaction force mechanism which exercises a reaction force on said control element to counteract a control element operating force, wherein said reaction force mechanism produces a rising reaction force with an increasing steering angle size ($\alpha$) as well as with at least one of an increasing longitudinal and lateral movement of the motor vehicle;

wherein the reaction force has a vehicle-longitudinal-speed-dependent reaction force component ($F_v$) which is constant below a predeterminable speed threshold value ($v_g$) and rises from said threshold value to a maximal speed ($v_m$);

wherein a steering-angle-size-dependent reaction force component ($F_\alpha$) extends linearly below a break steering angle size ($\alpha_k$) with a first slope and, above the break steering angle size, extends linearly with a second slope which is larger than the first slope, an intensity ($F_k$) of said reaction force component at the break (K) being selected to be falling with an increasing longitudinal vehicle speed (v).

6. The control element arrangement according to claim 5, wherein the reaction force contains a vibration force component which occurs when a driving dynamic limit situation is reached which is recognized by a driving dynamics control device, and wherein as said limit situation becomes more critical, a vibration frequency of said vibration force component becomes smaller and/or its vibration amplitude becomes larger.

7. The control element arrangement claim 6, wherein the reaction force is designed asymmetrically when the control element is operated in a first direction towards a user so as to be higher than in a case of an opposite operation in a second direction away from the user.

8. The control element arrangement according to claim 5, wherein the reaction force is designed asymmetrically when the control element is operated in a first direction towards a user so as to be higher than in a case of an opposite operation in a second direction away from the user.

* * * * *